United States Patent
Goswami et al.

(10) Patent No.: US 10,944,767 B2
(45) Date of Patent: Mar. 9, 2021

(54) IDENTIFYING ARTIFICIAL ARTIFACTS IN INPUT DATA TO DETECT ADVERSARIAL ATTACKS

(71) Applicant: International Business Machines Corporation, Armonk, NY (US)

(72) Inventors: Gaurav Goswami, Bangalore (IN); Sharathchandra Pankanti, Darien, CT (US); Nalini K. Ratha, Yorktown Heights, NY (US); Richa Singh, New Delhi (IN); Mayank Vatsa, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 15/885,935

(22) Filed: Feb. 1, 2018

(65) Prior Publication Data

US 2019/0238568 A1   Aug. 1, 2019

(51) Int. Cl.
*G06F 11/00* (2006.01)
*G06F 12/14* (2006.01)
(Continued)

(52) U.S. Cl.
CPC ........ *H04L 63/1416* (2013.01); *G06F 21/566* (2013.01); *G06N 3/04* (2013.01); *G06N 3/08* (2013.01)

(58) Field of Classification Search
CPC ... H04L 63/1416; G06F 21/566; G06F 30/27; H04N 5/23219; H04Q 2213/13378;
(Continued)

(56) References Cited

U.S. PATENT DOCUMENTS

| 6,446,038 B1 * | 9/2002 | Bayya ............... G10L 25/69 704/231 |
| 8,457,367 B1 | 6/2013 | Sipe et al. |

(Continued)

OTHER PUBLICATIONS

Zhou et al., On classifiction of distorted images with deep convolutional neural networks, 2017. (Year: 2017).*

(Continued)

*Primary Examiner* — Trong H Nguyen
(74) *Attorney, Agent, or Firm* — Stephen J. Walder, Jr.; Jeffrey S. LaBaw

(57) ABSTRACT

Mechanisms are provided for training a classifier to identify adversarial input data. A neural network processes original input data representing a plurality of non-adversarial original input data and mean output learning logic determines a mean response for each intermediate layer of the neural network based on results of processing the original input data. The neural network processes adversarial input data and layer-wise comparison logic compares, for each intermediate layer of the neural network, a response generated by the intermediate layer based on processing the adversarial input data, to the mean response associated with the intermediate layer, to thereby generate a distance metric for the intermediate layer. The layer-wise comparison logic generates a vector output based on the distance metrics that is used to train a classifier to identify adversarial input data based on responses generated by intermediate layers of the neural network.

22 Claims, 6 Drawing Sheets

(51) Int. Cl.
*G06F 12/16* (2006.01)
*G08B 23/00* (2006.01)
*H04L 29/06* (2006.01)
*G06N 3/08* (2006.01)
*G06N 3/04* (2006.01)
*G06F 21/56* (2013.01)

(58) Field of Classification Search
CPC ........ H04Q 2213/378; H04M 2201/40; H04M 2201/405; H04M 2201/41; G01N 2223/421; G06K 9/80; G06K 9/6227; G06T 2207/20084; G06T 2207/20081; G06N 3/02; G06N 3/04; G06N 3/08; G06N 20/00; G06N 20/10; G06N 20/20; G05B 2219/21002
See application file for complete search history.

(56) References Cited

U.S. PATENT DOCUMENTS

| | | | |
|---|---|---|---|
| 8,675,925 | B2 | 3/2014 | Derakhshani et al. |
| 2017/0169303 | A1 | 6/2017 | Connell, II et al. |
| 2020/0175290 | A1* | 6/2020 | Raja .................. G06K 9/00268 |

OTHER PUBLICATIONS

Li et al., Adversarial examples detection in deep networks with convolutional filter statistics, 2017. (Year: 2017).*
Gong et al., Adversarial and clean data are not twins, 2017. (Year: 2017).*
Bhagoji et al., Dimensionality reduction as a defense against evasion attacks on machine learning classifiers, 2017. (Year: 2017).*
"Multiple Encounters Dataset (MEDS)", National Institute of Standards and Technology Std., 2011. Available: http://www.nist.gov/itl/iad/ig/sd32.cfm, Accessed from the Internet on Nov. 9, 2018, 2 pages.
Amos, B et al., "OpenFace: face recognition with deep neural networks", http://github.com/cmusatyalab/openface. Accessed: Oct. 10, 2018, 5 pages.
Beveridge, J. R. et al., "The challenge of face recognition from digital point-and-shoot cameras", In IEEE Conference on Biometrics: Theory, Applications and Systems, Sep. 2013, 9 pages.
Bhagoji, Arjun N. et al., "Dimensionality reduction as a defense against evasion attacks on machine learning classifiers", arXiv:1704.02654v2, Apr. 2017, 20 pages.
Carlini, Nicholas et al., "Towards evaluating the robustness of neural networks", In IEEE Symposium on Security and Privacy, Mar. 2017, 19 pages.
Das, Nilaksh et al., "Keeping the bad guys out: Protecting and vaccinating deep learning with JPEG compression", arXiv:1705.02900v1, May 2017, 15 pages.
Dhamecha, Tejas I. et al., "Recognizing disguised faces: Human and machine evaluation", Plos One, vol. 9, Issue 7, Jul. 1-16, 2014.
Feinman, Reuben et al., "Detecting adversarial samples from artifacts", arXiv:1703.00410, Nov. 2017, 9 pages.
Founds, "NIST special datbse 32-multiple encounter dataset II", NIST Interagency/Internal Report—7807, Jul. 2011, 26 pages.
Gong, Zhitao et al., "Adversarial and clean data are not twins", arXiv:1704.04960, vol. 1, Apr. 2017, 7 pages.
Goodfellow, Ian J. et al., "Explaining and Harnessing Adversarial Examples", 3rd International Conference on Learning Representations (ICLR2015), arXiv: 1412.6572v3 [stat.ML], Mar. 20, 2015, pp. 1-11.
Gross, Ralph et al., "Multi-PIE", Image and Vision Computing 28(5), May 2010, 21 pages.
Grosse, Kathrin et al., "On the (Statistical) detection of adversarial examples", arXiv:1702.06280, vol. 2, Oct. 2017, 13 pages.
King, Davis E., "Dlib-ml: A machine learning toolkit", Journal of Machine Learning Research 10, Jul. 2009, 4 pages.
Kurakin, Alexey et al., "Adversarial examples in the physical world", arXiv:1607.02533, Workshop track—ICLR. Feb. 2017, 14 pages.
Liang, Bin et al., "Detecting Adversarial Image Examples in Deep Neural Networks with Adaptive Noise Reduction", IEEE Transactions on Dependable and Secure Computing Manuscript ID, Jun. 2018, 14 pages.
Liu, Jingtuo et al., "Targeting ultimate accuracy: Face recognition via deep embedding", Computer Science > Computer Vision and Pattern Recognition, CoRR abs/1506.07310, Jun. 2015, 5 pages.
Lu, Jiajun et al., "Safetynet: Detecting and rejecting adversarial examples robustly", ICCV paper, arXiv:1704.00103, Oct. 2017, 9 pages.
Majumdar, Angshul et al., "Face verification via class sparsity based supervised encoding", IEEE Transactions on Pattern Analysis and Machine Intelligence 39(6), Jun. 2017, 8 pages.
Metzen, Jan H. et al., "On detecting adversarial perturbations", Published as a conference paper at ICLR, arXiv:1702.04267, Feb. 2017, 12 pages.
Moosavi-Dezfooli, Seyed-Mohsen et al., "DeepFool: a simple and accurate method to fool deep neural networks", In IEEE Conference on Computer Vision and Pattern Recognition, Jun. 2016, 2574-2582.
Moosavi-Dezfooli, Seyed-Mohsen et al., "Universal adversarial perturbations", In IEEE Conference on Computer Vision and Pattern Recognition, Jul. 2017, 9 pages.
Nguyen, Anh et al., "Deep neural networks are easily fooled: High confidence predictions for unrecognizable images", In IEEE Conference on Computer Vision and Pattern Recognition, Jun. 2015, 10 pages.
Papernot, Nicolas et al., "The limitations of deep learning in adversarial settings", In IEEE European Symposium on Security and Privacy, Mar. 2016, 372-387.
Parkhi, Omkar M. et al., "Deep face recognition", In British Machine Vision Conference, vol. 1, 6, Jan. 2015, 12 pages.
Rauber, Jonas et al., "Foolbox v0.8.0: A python toolbox to benchmark the robustness of machine learning models", CoRR abs/1707.04131, Jul. 2017, 6 pages.
Schroff, Florian et al., "Facenet: A unified embedding for face recognition and clustering", In IEEE Conference on Computer Vision and Pattern Recognition, Mar. 2015, 9 pages.
Sharif, Mahmood et al., "Accessorize to a crime: Real and stealthy attacks on state-of-the-art face recognition", In ACM SIGSAC Conference on Computer and Communications Security, Oct. 2016, 13 pages.
Sun, Yi et al., "Deeply learned face representations are sparse, selective, and robust", In IEEE Conference on Computer Vision and Pattern Recognition, Jun. 2015, 9 pages.
Suykens, J.A.K. et al., "Least squares support vector machine classifiers", Article in Neural processing letters Jun. 1999, 9(3), Aug. 1998, 11 pages.
Szegedy, Christian et al., "Intriguing properties of neural networks", arXiv:1312.6199, Dec. 2013, 10 pages.
Taigman, Yaniv et al., "DeepFace: closing the gap to human-level performance in face verification.", In IEEE Conference on Computer Vision and Pattern Recognition, Jun. 2014, 8 pages.
Viola, Paul et al., "Robust real-time face detection", International Journal of Computer Vision 57(2), Jan. 2004, 18 pages.
Wu, Xiang et al., "A light CNN for deep face representation with noisy labels", arXiv:1511.02683v3, Apr. 24, 2017, 13 pages.
Li, Xin et al., "Adversarial Examples Detection in Deep Networks with Convolutional Filter Statistics", In Proceedings of International Conference on Computer Vision, Oct. 2017, 9 pages.
Meng, Dongyu et al., "MagNet: a Two-Pronged Defense against Adversarial Examples", Proceedings of ACM Conference on Computer and Communications Security, CCS' 17, Oct. 30-Nov. 3, 2017, 13 pages.
Ng, Hong-Wei et al., "A Data-Driven Approach to Cleaning Large Face Datasets", IEEE International Conference on Image Processing (ICIP), Oct. 27-30, 2014, 5 pages.
Xu, Weilin et al., "Feature Squeezing: Detecting Adversarial Examples in Deep Neural Networks", Network and Distributed Systems Security Symposium (NDSS), Feb. 2018, 15 pages.

(56) References Cited

OTHER PUBLICATIONS

Yi, Dong et al., "Learning Face Representation from Scratch", Cornell University Library, arXiv.org>cs>arXiv:1411.7923. Nov. 28, 2014, 9 pages.

Papernot, Nicolas et al., "Distillation as a Defense to Adversarial Perturbations against Deep Neural Networks", Accepted to the 37th IEEE Symposium on Security & Privacy, IEEE, 2016, arXiv: 1511.04508v2 [cs.CR], Mar. 14, 2016, pp. 1-16.

* cited by examiner

210

220

230

240

250

| System | MEDS | | | | | | PaSC | | | | | |
|---|---|---|---|---|---|---|---|---|---|---|---|---|
| | Original | Grids | xMSB | FHBO | ERO | Beard | Original | Grids | xMSB | FHBO | ERO | Beard |
| COTS | 24.1 | 20.9 | 14.5 | 19.0 | 0.0 | 24.8 | 40.3 | 24.3 | 19.1 | 13.0 | 0 | 6.2 |
| OpenFace | 66.7 | 49.5 | 43.8 | 47.9 | 16.4 | 48.2 | 39.4 | 10.1 | 10.1 | 14.9 | 6.5 | 22.6 |
| VGG-Face | 78.4 | 50.3 | 45.0 | 25.7 | 10.9 | 47.7 | 54.3 | 3.2 | 1.3 | 15.2 | 8.8 | 24.0 |
| LightCNN | 89.3 | 80.1 | 71.5 | 62.8 | 26.7 | 70.7 | 60.1 | 24.6 | 29.5 | 31.9 | 24.4 | 38.1 |
| L-CSSE | 89.1 | 81.9 | 83.4 | 53.8 | 27.3 | 70.5 | 61.2 | 43.1 | 36.9 | 29.4 | 39.1 | 39.8 |

FIG. 3

| Distortion | MEDS | | | | PaSC | | | |
|---|---|---|---|---|---|---|---|---|
| | LightCNN | VGG | (Liang et al. 2017) | (Feinman et al. 2017) | LightCNN | VGG | (Liang et al. 2017) | (Feinman et al. 2017) |
| Beard | 92.2 | 86.8 | 81.2 | 80.9 | 89.5 | 99.8 | 83.4 | 85.1 |
| ERO | 91.9 | 85.0 | 80.4 | 80.0 | 90.6 | 99.7 | 84.9 | 84.6 |
| FHBO | 92.9 | 84.4 | 79.8 | 79.6 | 81.7 | 99.8 | 78.3 | 77.8 |
| Grids | 68.4 | 84.4 | 62.1 | 62.4 | 89.7 | 99.9 | 85.1 | 85.7 |
| xMSB | 92.9 | 85.4 | 80.2 | 80.9 | 93.2 | 99.8 | 88.2 | 87.9 |

FIG. 4

| Algorithm | Database | Original | Distorted | Corrected |
|---|---|---|---|---|
| LCNN | PaSC | 60.5 | 25.9 | 36.2 |
| | MEDS | 89.3 | 41.6 | 61.3 |
| VGGFace | PaSC | 54.3 | 14.6 | 24.8 |
| | MEDS | 78.4 | 30.5 | 40.6 |

FIG. 5

IDENTIFYING ARTIFICIAL ARTIFACTS IN INPUT DATA TO DETECT ADVERSARIAL ATTACKS

BACKGROUND

The present application relates generally to an improved data processing apparatus and method and more specifically to mechanisms for identifying artificial artifacts in input data to detect adversarial attacks.

Computer vision is an interdisciplinary field that deals with how computers can be made for gaining high-level understanding from digital images or videos. From the perspective of engineering, computer vision seeks to automate tasks that the human visual system can do intuitively using specially configured computing devices. Computer vision tasks include methods for acquiring, processing, analyzing and understanding digital images, and extraction of high-dimensional data from the real world in order to produce numerical or symbolic information, e.g., in the forms of decisions. Understanding in this context means the transformation of visual images into descriptions of the world that can interface with other thought processes and elicit appropriate action. This image understanding can be seen as the disentangling of symbolic information from image data using models constructed with the aid of geometry, physics, statistics, and learning theory.

As a scientific discipline, computer vision is concerned with the theory behind artificial systems that extract information from images. The image data can take many forms, such as video sequences, views from multiple cameras, or multi-dimensional data from a medical scanner. As a technological discipline, computer vision seeks to apply its theories and models for the construction of computer vision systems.

Computer vision is used in many applications. For example, computer vision is used in safety systems, such as collision warning systems. Computer vision is also used in various security systems used to monitor residential, business, and industrial environments, traffic monitoring systems, satellite-based imaging systems, military systems, and the like.

One area of computer vision is facial recognition systems. A facial recognition system facial recognition system is a computer application capable of identifying or verifying a person from a digital image or a video frame from a video source. One of the ways to do this is by comparing selected facial features from the image and a face database. Facial recognition systems are typically used in security systems and can be compared to other biometrics such as fingerprint or eye iris recognition systems. Recently, facial recognition has also become popular as a commercial identification and marketing tool.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory. The method comprises processing, by a neural network, original input data representing a plurality of non-adversarial original input data and determining, by mean output learning logic executing in the data processing system, a mean response for each intermediate layer of the neural network based on results of processing the original input data. The method further comprises processing, by the neural network, adversarial input data representing adversarial input data having one or more distortions and comparing, by layer-wise comparison logic executing in the data processing system, for each intermediate layer of the neural network, a response generated by the intermediate layer based on processing the adversarial input data, to the mean response associated with the intermediate layer, to thereby generate a distance metric for the intermediate layer. Moreover, the method comprises generating, by the layer-wise comparison logic, a vector output based on the distance metrics for the intermediate layers, and training, based on the vector output, a classifier executing in the data processing system, to identify adversarial input data based on responses generated by intermediate layers of the neural network.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an example diagram comprising a table that summarizes the effect of image processing based adversarial distortions on OpenFace, VGG-Face, LightCNN, L-CSSE, and COTS;

FIG. 4 is an example diagram comprising a table that illustrates the results in detecting whether an image contains adversarial distortions or not using the VGG and LightCNN networks, in accordance with one illustrative embodiment;

FIG. 5 is an example diagram comprising a table that illustrates the results of the mitigation logic in accordance with one illustrative embodiment;

DETAILED DESCRIPTION

Figure 1:
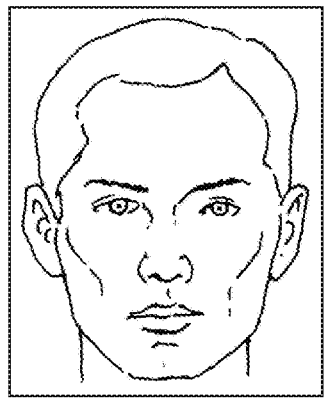
FIG. 1 is an example diagram of an original facial image.

As noted above, many systems make use of computer vision. In some cases, deep learning approaches, e.g., deep learning based convolutional neural networks, also referred to as deep neural networks (DNNs), and the like, have been applied to such computer vision or image/video relevant applications and tasks, e.g., image/event/action recognition, description generation for describing images/video, and the like. For example, in image/video based services, e.g., surveillance cameras, display monitors, recording devices, etc., deep learning mechanisms may be used to perform object identification, motion detection, facial feature recognition, and other image/video attribute analysis and classification operations on captured images/video.

In such cases, users of these services rely on them to identify relevant objects or motions, e.g., identifying guns or other weapons, identifying objects indicative of explosive devices, motions associated with suspicious activity such as stealing goods, breaking into facilities, etc. In some cases, users of these services may rely on them to identify specific individuals, such as via facial recognition technology employing DNNs. Based on the identification of objects, motions, or individuals, downstream systems, such as a security systems, may perform appropriate operations. For example, security systems may permit/deny access of an individual to a resource, e.g., physical premises or container, computer resource, financial resource such as an account or the like. In some cases, the downstream system may send notifications, log information in a computer storage, or the like, based on the results of the facial recognition and identification of the individual, e.g., a security system may send a notification to appropriate security personnel, law enforcement, or the like, indicating the identity of the individual.

The deep neural network (DNN) architecture based models using in such systems have high expressive power and learning capacity. However, they are essentially a black box method since it is not easy to mathematically formulate the functions that are learned within its many layers of representation. Realizing the potential of DNN architectures and recognizing the drawbacks, many researchers have started to design methods to exploit the drawbacks of deep learning based algorithms questioning their robustness and exposing their singularities.

The deep learning paradigm has seen significant proliferation in facial recognition applications due to the convenience of obtaining large training data, availability of inexpensive computing power and memory, and utilization of cameras at multiple places. Several algorithms such as DeepFace, DeepID, and the like, are successful examples of the combining of deep learning and facial recognition. However, it is also known that machine learning algorithms are susceptible to adversaries which can cause the classifier, i.e. the DNN that operates to classify the facial image, to yield incorrect results. Most of the time, these adversaries are unintentional and are in the form of outliers.

Recently, it has been shown that "fooling" images, i.e. images that have noise or other modifications, can be generated in such a manner where humans can correctly classify the images, however deep learning algorithms misclassify them. Such images can be generated via evolutionary algorithms or adversarial sample crafting using the fast gradient sign method, for example. In some cases, threat models have been explored by creating perturbed eyeglasses to fool face recognition algorithms.

Adversarial attacks on facial recognition mechanisms may cause significant security issues. That is, facial recognition is being utilized more often as part of a computerized high security system, such as with passport verification systems, visa systems, and other travel security systems, law enforcement systems, and the like. As these systems are designed to ensure the security of human beings, sensitive information, financial resources, and the like, the susceptibility of facial recognition to adversarial attacks in such systems is unacceptable.

The illustrative embodiments are based on the recognition that it is not required to attack the facial recognition system with sophisticated learning-based attacks in order to thwart the facial recognition. To the contrary, simpler attacks, such as adding random noise, or horizontal and vertical black grid lines, in the facial image may cause reduction in facial verification accuracies.

The illustrative embodiments described herein find singularities in deep learning based facial recognition engines, i.e. a facial recognition engine that implements a deep neural network, and provide detection and mitigation of adversarial attacks on these facial recognition engines. The first key step in taking countermeasures against such adversarial attacks is to be able to reliably determine which images contain adversarial distortions. The illustrative embodiments provide mechanisms for the automatic detection of such adversarial attacks using the response from hidden layers of the DNN. Once identified, the distorted images may be rejected from further processing or rectified using appropriate pre-processing techniques to prevent degradation in performance. To address this challenge without increasing the failure to process rate (by rejecting the samples, i.e. images), the illustrative embodiments provide mechanisms for implementing a selective dropout in the DNN that mitigates these adversarial attacks. Being able to not only automatically detect, but also correct, adversarial samples, i.e. adversarial facial images, at runtime is a crucial ability for a DNN based facial recognition engine that is deployed for real world applications.

It should be appreciated that while the present description will primarily focus on facial recognition based illustrative embodiments as an example, the illustrative embodiments are not limited to such. To the contrary, the mechanisms of the illustrative embodiments may be applied to any image recognition system in which specific regions of an identifiable object, individual, motion, or other element of a digital image may be identified and analyzed to detect artificial artifacts indicative of an adversarial input image and mitigation of such by way of selective dropout as discussed hereafter.

To further illustrate how adversarial distortions of images, such as may be part of an adversarial attack, may be able to degrade the performance of deep learning face recognition engine, consider the following observations regarding deep learning based facial recognition and example distortions that may be utilized to thwart proper operation of facial recognition engines and algorithms. For example, let x be the input to a deep learning based facial recognition engine, i.e. a facial recognition engine that implements a deep neural network (DNN). Assume that l is the output class label which, in the case of the output being an identification of an entity in the image, is an identity label, and in the case of the output being a verification, indicates that the input is the "same" or "different" from a reference image. An adversarial attack function a( ), when applied to the input facial image, falsely changes the predicted identity label or verification output. In other words, for an identification output, if a(x)=l' where l ≠ l', then a( ) is a successful adversarial attack on the DNN based facial recognition engine.

While adversarial learning has been used to showcase that the function a( ) can be obtained via optimization based on network gradients, the following observations are based on an evaluation of the robustness of deep learning based face recognition in the presence of image processing based distortions. Based on the information required in their design, these distortions can be considered at image-level or face-level. The observations leading to the development of the illustrative embodiments are based on two image-level distortions, i.e. grid based occlusion and most significant bit based noise, along with three face-level region based distortions, i.e. forehead and brow occlusion, eye region occlusion, and beard-like occlusion. These distortions are described in greater detail hereafter.

Figure 2:
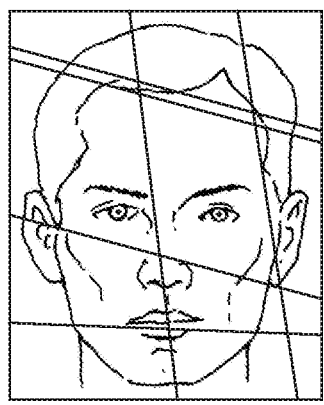
FIG. 2 is an example diagram illustrating a series of facial images comprising different types of distortions applied to the original image shown in FIG. 1.
Figure 2:
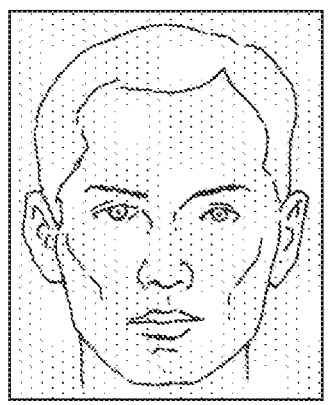
Figure 2:
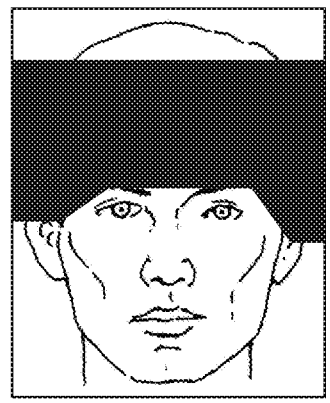
Figure 2:
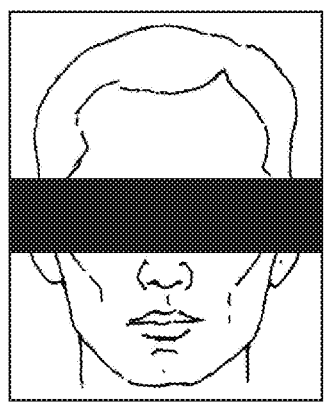
Figure 2:
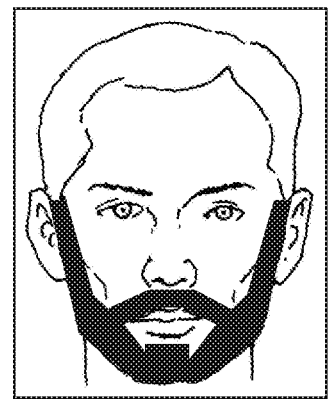

Distortions that are not specific to faces and can be applied to an image of any object are categorized as image-level distortions. Two such distortions are grid based occlusion and most significant bit change based noise addition. FIG. 1 illustrates an example of an original facial image, while FIG. 2 illustrates different types of distortions that may be applied to the original facial image of FIG. 2 in order to thwart facial recognition systems. Images 210-250 in FIG. 2 illustrate various occlusions added to the original facial image of FIG. 1. Image 210 and 220 in FIG. 2 are examples of sample images having image-level distortions while images 230-250 are examples of sample images having face-level distortions.

For a grid-based occlusion (termed as Grids) image-level distortion, a number of points are selected P={$p_1, p_2, \ldots, p_n$} along the upper (y=0) and left (x=0) boundaries of the image according to a parameter $\rho_{grids}$. The parameter $\rho_{grids}$ determines the number of grids that are used to distort each image with higher values resulting in a denser grid, i.e., more grid lines. For each point $p_i=(x_i, y_i)$, we select a point on the opposite boundary of the image, $p_i'=(x_i', y_i')$, with the condition if $y_i=0$, then $y_i'=H$ and if $x_i=0$, then $x_i'=W$, where, W×H is the size of the input image, H being the height dimension, and W being the width dimension of the image. Once a set of pairs corresponding to points P and P' have been selected for the image, one pixel wide line segments are created to connect each pair, and each pixel lying on these lines is set to 0 grayscale value, such as shown in image 210 of FIG. 2.

For a most significant bit based noise (xMSB) image-level distortion, three sets of pixels are selected, $X_1, X_2, X_3$, from the image stochastically such that $|X_i|=\phi_i \times W \times H$, where W×H is the size of the input image. The parameter $\phi i$ denotes the fraction of pixels where the $i^{th}$ most significant bit is flipped. The higher the value of $\phi i$, the more pixels are distorted in the $i^{th}$ most significant bit. For each $\mathcal{P}_j \in X_i, \forall_i \in [1, 3]$, the following operation is performed:

$$\mathcal{P}_{kj} = \mathcal{P}_{kj} \oplus 1 \qquad (1)$$

where, $\mathcal{P}_{kj}$ denotes the kth most significant bit of the $j^{th}$ pixel in the set and β denotes a bitwise XOR operation. It is to be noted that the sets $X_i$ are not mutually exclusive and may overlap. Therefore, the total number of pixels affected by the noise is at most $|X_1+X_2+X_3|$, but may also be lower depending on the stochastic selection. An example of xMSB distortion is shown in image 220 of FIG. 2.

Face-level distortions specifically require face-specific information, e.g., location of facial landmarks, i.e. significant facial features. The three face-level region based occlusion distortions mentioned above, i.e. eye region occlusion (ERO), forehead and brow occlusion (FHBO), and beard-like region occlusion, are applied after performing automatic facial landmark detection, e.g., after identifying facial landmarks of the forehead and brow regions, eye region, and beard-like region. In some cases, open source libraries, such as the DUB library, may be used to obtain the facial landmarks. Once facial landmarks are identified, they are used along with their boundaries for masking.

To obscure the eye region, for example, a singular occlusion band is drawn on the face image using the following operation:

$$I\{x, y\} = 0, \forall x \in [0, W], y \in y_e - \frac{d_{eye}}{\psi}, y_e + \frac{d_{eye}}{\psi} \qquad (2)$$

Here, $y_e=(y_{le}+y_{re})/2$, and $(x_{le}, y_{le})$ and $(x_{re}, y_{re})$ are the locations of the left eye center and the right eye center, respectively. The inter-eye distance $d_{eye}$ is calculated as $x_{re}-x_{le}$, and $\psi$ is a parameter that determines the width of the occlusion band. An example of eye region occlusion is shown in image 240 in FIG. 2. Similar to the eye region occlusion (ERO), the forehead and brow occlusion (FHBO) is created where facial landmarks on forehead and brow regions are used to create a mask, an example of which is shown in column 230 FIG. 2. For the beard-like occlusion, outer facial landmarks along with nose and mouth coordinates are utilized to create the mask as combinations of individually occluded regions, an example of which is shown in column 250 in FIG. 2.

Two publicly available face databases were used to make observations regarding facial recognition and the various types of image-level and face-level distortions mentioned above. In particular, the Point and Shoot Challenge (PaSC) database and the Multiple Encounters Dataset (MEDS)-II database were utilized. The PaSC database contains still-to-still and video-to-video matching protocols. The observations are based on the frontal subset of the still-to-still protocol which, at the time of the observations, contained 4,688 images pertaining to 293 individuals which were divided into equal size target and query sets. Each image in the target set was matched to each image in the query set, and the resulting 2344×2344 score matrix was used to determine the verification performance.

The MEDS-II database contained a total of 1,309 faces pertaining to 518 individuals. Similar to the case of PaSC, the observations made herein are based on the metadata provided with the MEDS-II database to obtain a subset of 858 frontal face images from the database. Each of these images was matched to every other image and the resulting 858×858 score matrix was utilized to evaluate the verification performance. For evaluating performance under the effect of distortions, 50% of the total images were selected from each database and corrupted with the above described image-level and face-level distortions separately. These distorted sets of images were utilized to compute the new score matrices for each case.

The OpenFace, VGG-Face, LightCNN, and L-CSSE networks were used to gauge the performance of deep face recognition algorithms in the presence of the aforementioned distortions. The OpenFace library is an open source implementation of FaceNet and is openly available to all members of the research community for modification and experimental usage. The VGG deep face network (VGG-Face) is a deep convolutional neural network (CNN) with 11 convolutional blocks where each convolution layer is followed by non-linearities, such as rectified linear unit (ReLU) and max pooling. LightCNN is another publicly available deep network architecture for face recognition that is a CNN with max-out activations in each convolutional layer and achieves good results with just five convolutional layers. L-CSSE is a supervised autoencoder formulation that utilizes a class sparsity based supervision penalty in the loss function to improve the classification capabilities of autoencoder based deep networks. In order to assess the relative performance of deep face recognition with a non-deep learning based approach, the performance of these deep learning based algorithms was compared with a commercial-off-the-shelf (COTS) matcher. No fine-tuning was performed for any of these algorithms before evaluating their performance on the test databases.

FIG. 3 summarizes the effect of image processing based adversarial distortions on OpenFace, VGG-Face, LightCNN, L-CSSE, and COTS. The table shown in FIG. 3 comprises values indicating the genuine acceptance rate (GAR) as a percentile at 1% false acceptance rate (FAR). Genuine Accept Rate, or GAR, is the measure of performance that indicates how many times the approach is able to correctly identify the target class (adversarial attack in this case). False Accept Rate, or FAR, measures how many false accepts are made by the approach, i.e., predicting the target class when the correct answer is something else. FAR is usually used to denote the operating point of the algorithm wherein you limit the amount of false accepts that are tolerable and then report the genuine accept rate accordingly. For example, a performance of 60% GAR at 1% FAR means that the approach can correctly detect the target class 60 out of 100 times while only making the mistake of raising a false alarm 1 out of 100 times.

On the PaSC database, as shown in FIG. 3, while OpenFace and COTS perform comparably to each other at approximately 1% FAR, OpenFace performs better than the COTS algorithm at all further operating points when no distortions are present. However, it is observed that there is a sharp drop in OpenFace performance when any distortion is introduced in the data. For instance, with a grids attack, at 1% FAR, it is observed that the GAR of OpenFace drops by 29.3% and of VGG by 28.1%, whereas the performance of COTS only drops by 16% which is about half the drop compared to what OpenFace and VGG-Face experience. It should also be noted that there is a similar scenario in the presence of noise attack, where the performance of OpenFace and VGG drops down by approximately 29% as opposed to the loss of 21.2% observed by COTS. In cases of LightCNN and L-CSSE, they both have shown higher performance with original images. However, as shown in FIG. 3, similar levels of drops are observed. It is to be noted that for xMSB and grid attacks, L-CSSE is able to achieve relatively better performance because L-CSSE is a supervised version of an autoencoder which can handle noise better.

Overall, deep learning based algorithms experience higher performance drops as opposed to the non-deep learning based COTS. In the case of occlusions, however, deep learning based algorithms suffer less as compared to COTS. Thus, it can be assessed that the COTS algorithm fails to perform accurate facial recognition when there is a highly limited facial region available, such as in the low-resolution PaSC images in the presence of occlusions. Similar performance trends are observed on the MEDS database on which, for original images, deep learning based algorithms outperform the COTS matcher with a GAR of 60-89% at 1% FAR respectively as opposed to 24.1% by COTS. The accuracy of deep learning algorithms drops significantly more than the accuracy of COTS.

A similar analysis was performed with learning based adversaries on the PaSC database. The results of the VGG-Face model with original and perturbed images are also shown in FIG. 3. It is interesting to observe that the drop with regard to accuracy obtained by simple image processing operations is equivalent to the reduction achieved by learned adversaries. This clearly shows that deep learning models are not resilient to even simple perturbations and therefore, it is very important to devise effective strategies for detection and mitigation of attacks.

Having illustrated the susceptibility of deep learning based facial recognition engines employing deep neural networks (DNNs) to simple perturbation attacks, such as the image-level and face-level distortion based adversarial attacks mentioned above, the illustrative embodiments provide mechanisms for detecting and mitigating such adversarial attacks. That is, as can be seen from the above, adversarial attacks can substantially reduce the performance of usually accurate deep neural network based facial recognition engines and thus, it is essential to address such singularities in order to make face recognition engines more robust and useful in real world applications.

The illustrative embodiments enhance deep neural network based facial recognition engines by providing mechanisms that detect adversarial attacks based on the output hidden layers of the deep neural network, i.e. the intermediate representations of the input image. That is, each layer in a deep neural network (DNN) essentially learns a function or representation of the input data, i.e. the input image. The final feature computed by a DNN is derived from all of the intermediate representations in the hidden layers of the DNN. In an ideal scenario, the internal representation at any given layer for an input image should not change drastically with minor changes to the input image. However, that is not the case in practice, as proven by the existence of adversarial examples, as discussed above. The final features obtained for a distorted and undistorted image are measurably different from one another since these features map to different classes. Therefore, it is implied that the intermediate representations also vary for such cases.

Thus, it can be asserted that the internal representations computed at each layer are different for distorted images as compared to undistorted images. Therefore, in order to detect whether an incoming image is perturbed or distorted in an adversarial manner, the mechanisms of the illustrative embodiments may determine that the input image is distorted or perturbed if its layer-wise internal representations deviate substantially from the corresponding mean representations.

In order to develop an adversarial attack detection mechanism, the filter responses in a CNN architecture are first analyzed. Network visualization analysis showcases the filter responses for a distorted image at selected intermediate layers that demonstrate the most sensitivity towards noisy data. It has been observed that many of the filter outputs primarily encode the noise instead of the input signal.

It has also been observed that the DNN based representation is relatively more sensitive to the input data than a CNN and, while that sensitivity results in a more expressive representation that offers higher performance in the case of undistorted data, it also compromises the robustness towards noise, such as with the above discussed image-level and face-level distortions. Since each layer in a DNN learns increasingly more complicated functions of the input data based on the functions learned by the previous layer, any noise in the input data is also encoded in the features and thus, leads to a higher reduction in the discriminative capacity of the final learned representation. Similar conclusions can also be drawn from the results of other existing adversarial attacks on deep networks, where the addition of a noise pattern leads to spurious classification.

To counteract the impact of such attacks and ensure practical applicability of DNN based facial recognition engines, the DNNs must either be made more robust towards noise at a layer level during training, or it must be ensured that any input is preprocessed to filter out any such distortion prior to computing its deep representation for recognition.

In accordance with the illustrative embodiments, in order to detect distortions in input images, the pattern of the intermediate representations for undistorted images are compared with distorted images at each layer. The differences in these patterns are used to train a classifier that can categorize an unseen input as an undistorted/distorted image. As an example embodiment, a subset of images from an image database, e.g., 40,000 images from a database comprising 50,000 or more images, are selected and used to compute a set of layer-wise mean representations, $\mu$, as follows:

$$\mu_i = 1/N_{train} \Sigma_{j=1}^{N train} \phi_i(I_j) \quad (3)$$

where, $I_j$ is the jth image in the training set, $N_{train}$ is the total number of training images, $\phi_i$ is the mean representation for the ith layer of the network, and $\phi_i(I_j)$ denotes the representation obtained at the ith layer of the network when $I_j$ is the input image. Once the mean representations $\mu$ are computed for each layer, the intermediate representations computed for an arbitrary image I can be compared with the layer-wise means using the following operation:

$$\psi_i(I, \mu) = \Sigma_z^{\lambda_i}(|\phi_i(I)_z| - |\mu_{iz}|)/(|\phi_i(I)_z| + |\mu_{iz}|) \quad (4)$$

where, $\psi_i(I, \mu)$ denotes the Canberra distance between $\phi_i(I)$ and $\mu_i$, $\lambda_i$ denotes the length of the feature representation computed at the ith layer of the network, and $\mu_{iz}$ denotes the zth element of $\mu_i$. While the Canberra distance is used in this example, it should be appreciated that other distance metrics may also be used including, but not limited to, cosine distance, Mahalanobis distance, and Euclidean distance, for example. If the number of intermediate layers in the network is $N_{layers}$, the above operation obtains $N_{layers}$ distances for each image I. These distances are used as values in feature vectors, e.g., feature vector length=number of layers, to train a Support Vector Machine (SVM) classifier so as to train each input image as either normal/adversarial, i.e. non-distorted/distorted.

With regard to training the SVM using these feature vectors, the SVM is provided with a labeled feature matrix as input which contains feature vectors belonging to both adversarial and genuine classes. A SVM is a machine learning approach to perform classification which traditionally performs 2 class classification, which is the case in classifying each feature vector as adversarial or genuine. Using the input, the SVM approach learns a set of support vectors and determines an optimal decision boundary to maximize its performance. The decision boundary is learned in the form of the set of support vectors and the weights associated with each support vector along with other hyperparameters that are learned using a grid search performed on a validation set. The validation set is a held-out subset of the training data that is provided to the SVM.

Thus, with the mechanisms of the illustrative embodiments, the DNN's output from intermediate, or hidden, layers is characterized by the mean output for undistorted (normal) images during training. Using a distorted set of training images, a detection module learns the distances of the intermediate activations of each intermediate layer, when given distorted input, with the mean activations for undistorted input. Using these distance metrics as feature vectors, a SVM classifier is trained to classify each image as normal/adversarial. Thus, the trained SVM may be utilized to evaluate the distances between intermediate representations of an input image and the means at the various hidden or intermediate layers of the DNN and automatically determine, based on this evaluation, whether or not the input image is a distorted image, i.e. an adversarial attack on the facial recognition engine.

While detection of distorted or adversarial input images is important to improving the operation of a DNN based facial recognition engine, an ideal automated solution should not only automatically detect distorted images that may be part of an adversarial attack, but also mitigate the effect of such an adversarial attack, so as to maintain as high performance of the DNN based facial recognition engine as possible. Therefore, the next step in defending against adversarial attack is mitigation.

Mitigation of adversarial attacks may be achieved by discarding or preprocessing, e.g., denoising, the affected regions of an input image, depending on the desired implementation. With regard to discarding the input images determined to be adversarial attacks, further processing of the input images may be discontinued in the event that the input image is classified as adversarial. In such a case, logs or notifications of the adversarial attack may be generated, however the additional processing that is based on the facial recognition, e.g., gaining access to resources or the like, is not performed so as to avoid generating erroneous results.

With regard to mitigation of the adversarial attack, in order to accomplish this mitigation, the illustrative embodiments again utilize the characteristics of the output produced in the intermediate layers of the DNN. The illustrative embodiments select a subset of images from an image database, e.g., 10,000 images from the approximately 50,000 images in a database, which are partitioned into mutually exclusive and exhaustive subsets (i.e. all of the images are accounted for in the subsets and no image is left unused or discarded in the process of creating the subset), e.g., mutually exclusive and exhaustive subsets of 2,000 images each when 5 subsets are utilized. The number of subsets may be set to the number of different types of distortions being evaluated with each subset of images being processed using a different distortion. The set of distorted images, e.g., the set of 10,000 distorted images, thus obtained contains separate subsets pertaining to the different distortions utilized by the implementation, e.g., 2,000 images pertaining to each of the five distortions discussed above, i.e. the 2 image-level distortions and 3 face-level distortions. Using this data, the illustrative embodiments compute a filter-wise score per layer that estimates the particular filter's sensitivity towards distortion as follows:

$$\in_{ij} = \Sigma_{k=1}^{Ndis} ||\phi_{ij}(I_k) - \phi_{ij}(I'_k)|| \qquad (5)$$

where, $N_{dis}$ is the number of distorted images in the training set, $\in_{ij}$ denotes the score and $\phi_{ij}()$ denotes the response of the jth filter in the ith layer, $I_k$ is the kth distorted image in the dataset, and $I'_k$ is the undistorted version of $I_k$. The term "filter" refers to the fact that each layer applies the convolution operation with a "filter." These filters are learned during the training of the network and, in the illustrative embodiments, are image filters. These filters produce the "filtered" output or processed output which may capture a particular type of feature about the image.

Once these values are computed, the top η layers are selected based on the aggregated ∈ values for each layer. These are the hidden layers of the DNN identified to contain the most filters that are adversely affected by the distortions in data. For each of the selected η layers, the top κ fraction of affected filters are disabled by modifying the weights of these filters to be a weight of 0 before computing the features. The term "features" refers to characteristics of the image that help in reaching a decision about its classification. Such features may include, for example, edges, boundaries of objects, texture, etc. A feature is essentially a series of values, also referred to as a feature vector. It is the intermediate output of a convolutional neural network (CNN) and used to determine the class of the input image. For example, on image may have a feature vector of {1, 0, 1, 0, 1} and another image may have a feature vector of {1, 0, 0, 0, 1}. A distance, or similarity, between two feature vectors may be computed using a distance metric, e.g., chi-square, Euclidean, 11, etc., and a score of how similar the two images are may be generated based on the distance or similarity. This is the fundamental operation of "matching" that is used to predict the classification of an image using its scores with images where the label is known.

The values of the parameters η and κ may be determined via grid search optimization on the training data with verification performance as the criterion. A grid search is a systematic search through possible values of hyperparameters. The values of η and κ, in some illustrative embodiments, may be values from 0 to 1. Assume that there is a step size of 0.2, such that η=[0, 0.2, 0.4, 0.6, 0.8, 1.0], and κ has a similar set of values. A grid search would involve running a test using all potential combinations of η and κ (6×6=36 combinations in this example) and then deciding which combination is best. To decide which is the best, a criterion needs to be used and measured. In the example embodiment, a criterion of the combination of η and κ which maximizes the verification performance on a validation set of images is chosen.

The illustrative embodiments may also apply a median filter, e.g., a median filter of size 5×5, for denoising the image before extracting the features. The median filter can handle many common types of image noises. The size of the median filter determines the strength of the denoising. The size of the median filter depends on the image size and the desired level of denoising.

The above described approach is referred to herein as "selective dropout" and is aimed at increasing the network's robustness towards noisy data by removing the most problematic filters from the pipeline, i.e. the intermediate layers of the DNN and the internal pipeline of the DNN's processing. The nodes and layers that will be affected by the selective dropout are determined during training with the dropout itself being performed during runtime so that the DNN is modified dynamically when adversarial inputs are detected by the SVM, and the DNN operates without alteration when a non-adversarial input image is received, so as to maximize the level of performance of the DNN.

With this approach, only the most problematic filters, e.g., 10% of the entire DNN, are dropped-out. The majority of the DNN, e.g., 90%, continues to function. The principle is that it is better to use less data than incorrect data to obtain the final feature vector and/or decision from the DNN. The DNN does not classify the image as adversarial/genuine, but instead that is performed by the SVM. The DNN performs the recognition that it is meant to perform, e.g., match a face to an identity or classify objects/activities/entities, in the images. The selective dropout helps the DNN perform its operations more accurately on adversarial images compared to not using mitigation and continuing to use filters that are greatly affected by adversarial inputs.

With the selective dropout of filters in the DNN, the adversarial input image is processed via matching logic. The objective of the DNN, in illustrative embodiments in which facial recognition is being performed for example, is to extract features to perform 1:1 face matching. If two different images of the same person are provided to the DNN, the DNN and the matching logic should be able to determine that they are the same person (class=same) and vice versa if the images are of different people (class=not same). A real life application of this is when an immigration officer matches a photograph of a person taken at an airport versus a known blacklist of suspects one-by-one, or a person's own passport or visa photograph. The feature vector generated by the DNN is processed by the matching logic to determine if the features match a given labeled image.

Experimentally, for training the detection logic used to detect adversarial attacks, undistorted sample images from an image database were utilized, e.g., the remaining undistorted 10,000 images from the above referenced approximately 50,000 image database. From these undistorted sample images, distorted samples were generated using the distortions considered by the particular implementation, e.g., the 5 distortions noted above with 2,000 images per distortion (assuming 10,000 images being utilized) that were also randomly selected from the image database. For DeepFool, as another example, a subset of 1,680 face images from the CMU Multi-PIE database with 5 images from each of 336 subjects with both distorted and undistorted versions were used for training the detection logic. Since the VGG-Face network has 20 intermediate layers, a feature vector having 20 distances for each image was obtained, for example. A grid search based parameter optimization was performed using a 20,000×20 training matrix to optimize and learn the SVM model. For DeepFool, the size of the training data was 3,360×20. Once the detection logic was trained, and thus the model was learned, any given test image could then be characterized by the distance vector and processed by the SVM. The score given by the detection logic for the image to belong to the distorted class was used as a distance metric. It was observed that the metric thus obtained was able to classify distorted images on unseen databases. The mitigation logic was evaluated with both LightCNN and VGG-Face networks on both the PaSC and MEDS databases with the same experimental protocol as used in obtaining the verification results.

The results of the illustrative embodiments in detecting whether an image contains adversarial distortions or not using the VGG and LightCNN networks are shown in FIG. 4. Each distortion based subset comprises of a 50% split of distorted and undistorted faces. These are the same sets that have been used for evaluating the performance of the three face recognition systems. As mentioned previously, the detection logic is trained on a separate database which does not have any overlap with the test set.

As can be seen from FIG. 4, the proposed detection logic performs almost perfectly for the PaSC database with the VGG network and maintains accuracies of 80-90% with the LightCNN network. The lowest performance was observed on the MEDS database (classification accuracy of 68.4% with the LightCNN network). The lower accuracies with the LightCNN can be attributed to the smaller network depth which results in smaller size features to be utilized by the detection algorithm. It should be noted that the detection logic of the illustrative embodiments maintains high true positive rates even at very low false positive rates across all distortions on both databases, which is desirable when the cost of accepting a distorted image is much higher than a false reject for the facial recognition engine. Lower performance with the MEDS database may be attributable to more extreme illumination cases as compared to PaSC. In addition, it was noted, based on reducing the feature dimensionality to deduce the most important features using sequential feature selection based on classification loss by an SVM model learned on a given subset of features, that comparing the representations computed by the DNN in its intermediate layers indeed produces a good indicator of the existence of distortions in a given image.

In addition to the 5 image-level and face-level adversarial attacks discussed above, the efficacy of the detection logic of the illustrative embodiments on two existing attacks that utilize network architecture information for adversarial perturbation generation, i.e., DeepFool and Universal adversarial perturbations, has been evaluated. The performance of the detection logic of the illustrative embodiments has also been compared with two recent adversarial detection techniques based on adaptive noise reduction (Liang et al. 2017) and Bayesian uncertainty (Feinman et al. 2017). The same training data and protocol was used to train and test all three detection approaches. The results of detection are presented in the table represented in FIG. 6.

Figure 6:
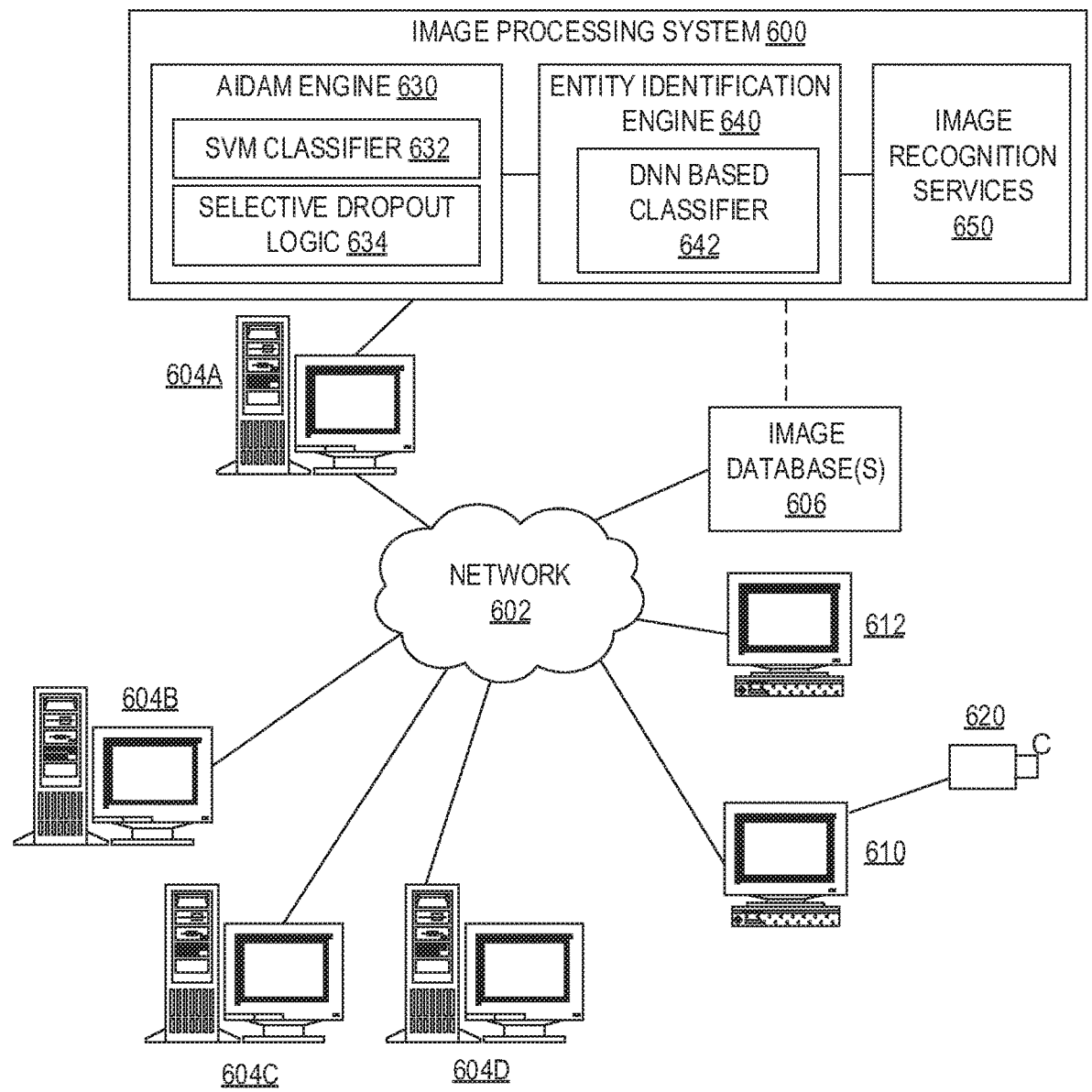
FIG. 6 is an example diagram illustrating an example distributed data processing system in which aspects of the illustrative embodiments may be implemented.

As can be seen from the table in FIG. 6 that the detection logic of the illustrative embodiments is at least 11% better at detecting DNN architecture based adversarial attacks as compared to the existing algorithms for all cases except for detecting DeepFool perturbed images from the MEDS database where it still outperforms the other approaches by more than 3%. This may be due to the fact that MEDS has overall higher image quality as compared to PaSC and even the impact of these near imperceptible perturbations (DeepFool and Universal) on verification performance is minimal for the database. Therefore, it is harder to distinguish original images from perturbed images for these distortions for all the tested detection algorithms.

The table in FIG. 5 presents the results of the mitigation logic of the illustrative embodiments for one example implementation. Mitigation is a two-step process to enable better performance and computational efficiency. First, using the detection logic of the illustrative embodiments, a selective mitigation of only those images that are considered adversarial by the detection logic is performed. Face verification results after applying the mitigation logic on the MEDS and PaSC databases are presented in FIG. 5. As can be seen from FIG. 5, the mitigation logic of the illustrative embodiments is able to improve the verification performance on both the databases with either network and bring it closer to the original. Thus, it can be seen that even discarding a certain fraction of the intermediate network output, that is the most affected by adversarial distortions, using the mitigation logic of the illustrative embodiments and the selective dropout discussed above, results in better recognition than incorporating this fraction of intermediate network output into the obtained feature vector.

In view of the above, it can be seen that by providing a mechanism for training a SVM classifier to identify adversarial input images from the results generated at intermediate layers of a DNN, and providing a mechanism for mitigating the impact of the adversarial input image on the performance of the DNN by performing selective dropout, improved performance of entity identification engines, such as facial recognition systems, may be achieved. The following description will set forth example illustrative embodiments of implementations of such detection and mitigation mechanisms. However, before continuing the discussion of the various aspects of the illustrative embodiments in more detail, it should first be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the terms "engine" and "logic", as used herein with regard to describing embodiments and features of the illustrative embodiments, is not intended to be limiting of any particular implementation for accomplishing and/or performing the actions, steps, processes, etc., attributable to and/or performed by the engine. An "engine" or "logic" may be software executed on hardware, hardware, and/or firmware, or any combination thereof, that performs the specified functions including, but not limited to, any use of a general and/or specialized processor in combination with appropriate software loaded or stored in a machine readable memory and executed by the processor. Further, any name associated with a particular "engine" or "logic" is, unless otherwise specified, for purposes of convenience of reference and not intended to be limiting to a specific implementation. Additionally, any functionality attributed to an "engine" or "logic" may be equally performed by multiple engines or logic elements, incorporated into and/or combined with the functionality of another engine or logic element of the same or different type, or distributed across one or more engines or logic elements of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for detecting adversarial image inputs to a deep neural network (DNN)-based classifier of an entity identification engine, which in some illustrative embodiments may be a facial recognition system, for example. The present invention further provides mechanisms for mitigating the impact of adversarial image inputs on the operation of the DNN-based classifier by providing for selective dropout of filters in the DNN-based classifier that are more sensitive to such adversarial image inputs. By providing adversarial image input identification and mitigation, the mechanism of the illustrative embodiments allow image recognition services, e.g., deep learning services, to perform their operations for recognizing individuals/objects/motions in the images/video with less susceptibility to adversarial attacks. For purposes of the present description, it should be appreciated that the term "image" as used herein may refer to a single image or a single frame of a series of images, such as in the case of video content. The illustrative embodiments may be applied to single images and/or frames of video content, however for ease of the present description, these will be collectively referred to as "images" herein.

The mechanism of the illustrative embodiments may be utilized with any type of image recognition service and may be used for any desired purpose for performing image recognition in accordance with the particular implementation. For example, various types of object, entity, or activity identification may be used for various types of system implementations and to perform various types of object, entity, or activity identification operations, such as may be provided in security system purposes, self-driving cars, targeted advertisement systems, autonomous construction systems, digital three dimensional reconstruction systems, and the like. For purposes of illustration, the illustrative embodiments described herein assume an application to facial recognition and implementation in a facial recognition system which may perform a desired operation based on the identification of an individual based on the identification and matching of a facial image of the individual to a reference facial image, e.g., a stored facial image. Just as example applications, such facial recognition may be used to match a facial image to known criminals for purposes of notifying law enforcement, confirming the identity of an employee or authorized personnel for access to resources, or the like. It should be appreciated that the objects and entities that may be identified based on the image recognition services of the illustrative embodiments may be any type of object or entity, i.e. any type of person, place, or thing that may be identified in an image or frame of video content.

Figure 7:
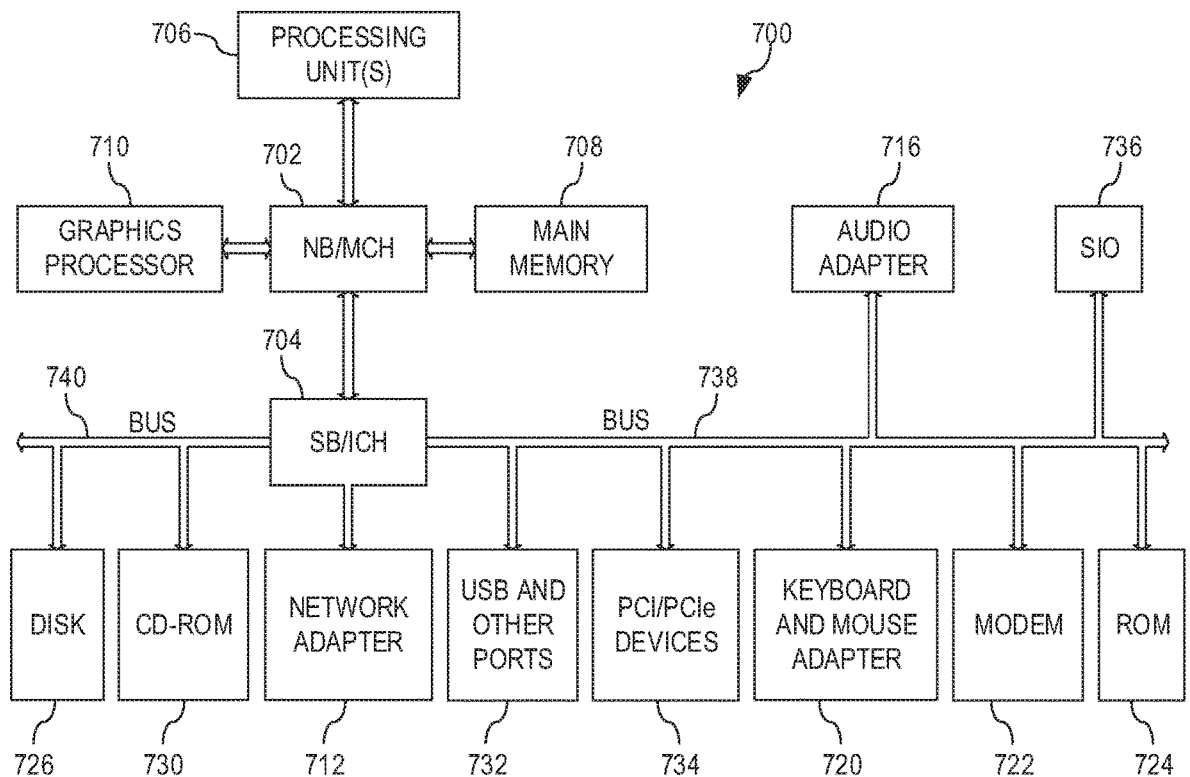
FIG. 7 is an example diagram of a data processing system in which aspects of the illustrative embodiments may be implemented.

The illustrative embodiments may be utilized in many different types of data processing environments. In order to provide a context for the description of the specific elements and functionality of the illustrative embodiments, FIGS. 6-7 are provided hereafter as example environments in which aspects of the illustrative embodiments may be implemented. It should be appreciated that FIGS. 6-7 are only examples and are not intended to assert or imply any limitation with regard to the environments in which aspects or embodiments of the present invention may be implemented. Many modifications to the depicted environments may be made without departing from the spirit and scope of the present invention.

FIG. 6 is directed to describing a distributed data processing system in which one or more computing devices are specifically configured to provide an image processing system 600, e.g., a data processing system that performs deep learning and artificial intelligence based functionality for processing images, and in particular for performing image recognition services based on entity identification in images. The data processing system(s), such as server 604A in FIG. 6, may be configured as a cognitive system that implements such artificial intelligence and deep learning. As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale.

A cognitive system performs one or more computer-implemented cognitive operations that approximate a human thought process as well as enable people and machines to interact in a more natural manner so as to extend and magnify human expertise and cognition. A cognitive system comprises artificial intelligence logic and machine learning logic, which may be provided as specialized hardware, software executed on hardware, or any combination of specialized hardware and software executed on hardware. The logic of the cognitive system implements the cognitive operation(s), which in the context of the present invention may include image recognition service operations, such as object or entity identification, activity identification, classification of such objects, entities, or activities, generating alerts based on such identification and classification, sending notifications to other computing devices, logging occurrences of entities and activities identified in images/video content, and the like.

As shown in FIG. 6, the image processing system 600, which again may be a cognitive system, is implemented on one or more computing devices 604A-D (comprising one or more processors and one or more memories, and potentially any other computing device elements generally known in the art including buses, storage devices, communication interfaces, and the like) connected to the computer network 602. For purposes of illustration only, FIG. 6 depicts the image processing system 600 being implemented on computing device 604A only, but as noted above the image processing system 600 may be distributed across multiple computing devices, such as a plurality of computing devices 604A-D.

The computing devices implementing the image processing system 600 are specifically configured to implement this image processing system 600 through execution of appropriate software instructions, providing of particular hardware devices, and the like, that modify the computing device from a generic computing device to a specially configured computing device. In particular, the specially configured computing device comprises an image processing system 600 having an adversarial image detection and mitigation (AIDAM) engine 630, an entity identification engine 640, and image recognition services 650, and is specifically configured to perform image recognition on an input image or frame of video content and output information indicative of the entities/actions identified and classified by the image processing system 600. In some illustrative embodiments, the results of the image recognition may be used to trigger the performance of other operations by the image processing system 600 including applying artificial intelligence to determine when to generate alerts, send notifications, log occurrences within a monitored environment, allow/deny access to resources (either physical or logical), or the like.

The network 602 includes multiple computing devices 604A-D, which may operate as server computing devices, and 610-612 which may operate as client computing devices, in communication with each other and with other devices or components via one or more wired and/or wireless data communication links, where each communication link comprises one or more of wires, routers, switches, transmitters, receivers, or the like. In some illustrative embodiments, the image processing system 600 and network 602 enables image recognition services functionality for one or more image processing system 600 users via their respective computing devices 610-612. The computing devices 610-612 may comprise image capturing devices 620, e.g., cameras that capture digital images, for capturing an image or video content of a monitored environment, or other sources of images or video content comprising a sequence of frames, such as image databases and the like.

The image processing system 600 may receive image data or video data (collectively referred to as image data) from a computing device 610, for example, for processing to thereby identify entities in the image data, identify activities occurring within the image data, or the like. The image processing system 600 may utilize one or more image databases 606, either directly accessible or accessible via the network 602, to facilitate such identification by matching features of a received image with features of stored images in the image database(s) 606. The received image data may be image data captured by the image capture device 620 associated with the computing device 610, e.g., a digital camera, digital video camera, scanner, facial recognition scanner, biometric scanning device, or other type of image capturing device, and provided to the image processing system 600 via the network 602. In some cases, the image capture device 620 may monitor a monitored environment, such as a business location, governmental location, home location, or the like, images of which are captured by the image capture device 620. For purposes of the present description, it will be assumed that the image capture device 620 is a digital camera that captures facial images of individuals for which the image processing system 600 is used to perform facial recognition services.

As previously noted above, in some cases, the image data that is provided to the image processing system 600 may comprise adversarial image data in which the image data has been modified using one or more of the image-level or face-level distortions discussed above. As such, the adversarial image data may cause the image processing system 600 to incorrectly process the image data, as previously discussed with regard to FIGS. 1 and 2 above. The image processing system 600 of the illustrative embodiments comprises the AIDAM engine 630 which works in conjunction with the DNN based classifier 642 of the entity identification engine 640 to harden the DNN based classifier against such adversarial image data by first providing a SVM classifier 632 that is trained to classify input images as to whether they contain adversarial image data or not, and then in the case that adversarial image data is determined to be present, performing selective dropout of filters in the DNN based classifier 642 using the selective dropout logic 634.

As previously discussed above, the SVM classifier 632 is trained to detect adversarial input image data based on the responses of the intermediate, or hidden, layers of the DNN based classifier. As described previously, in order to detect distortions in input images, the pattern of the intermediate representations for undistorted images are compared with distorted images at each layer. The differences in these patterns are used to train the SVM classifier 632 which can then categorize an unseen input as an undistorted/distorted image. In some illustrative embodiments, the DNN's output from intermediate, or hidden, layers is characterized by the mean output for undistorted (normal) images during training. Using a distorted set of training images, detection logic (not shown) of the AIDAM engine 630 learns the distances of the intermediate activations of each intermediate layer, when given distorted input, with the mean activations for undistorted input. Using these distance metrics as feature vectors, the SVM classifier 632 is trained to classify each image as normal/adversarial or undistorted/distorted. Thus, the trained SVM classifier 632 may be utilized to evaluate the distances between intermediate representations of an input image and the means at the various hidden layers of the DNN and automatically determine, based on this evaluation, whether or not the input image is a distorted image, i.e. an adversarial attack, on the image processing system 600.

Based on the classification by the SVM classifier 632, the selective dropout logic 634 may be invoked to mitigate the effects of the adversarial input image data on the operation of the DNN based classifier 642 of the entity identification engine 640. The selective dropout logic 634 is trained as previously described above to identify the hidden layers of the DNN based classifier 642 that contain the most filters that are adversely affected by distortions in input image data. For each of the layers, a top fraction of affected filters are disabled by modifying the weights of these filters (or nodes) to be a weight of 0 before computing features, thereby effectively dropping out these filters or nodes from processing the input image data. Hence the output of the DNN based classifier 642 is made less susceptible to the adversarial input image data and will generate an accurate result even in the presence of such adversarial input image data.

Based on the entity identification performed by the entity identification engine 640 using the DNN based classifier 642 whose operation may be modified by the selective dropout logic 634 when adversarial input image data is detected by the SVM classifier 632, the image processing system 600 may output a result, may initiate or trigger an operation, and/or may perform an operation based on the detection and classification of entities or actions present in the modified image data. Such notifications, outputs, and the like, may be generated by the image recognition services 650 which may be specifically configured to perform such operations dependent on the desired implementation and use to which the image processing system 600 is being put. For example, if the image processing system 600 determines that a particular entity or action is present in the modified image data, rules may be applied by the image recognition services 650 to the identification and classification of the entity or action to cause operations to be performed. In some cases the rules may cause a notification to be sent to a particular computing device or other communication device, e.g., send an instant message to a user's mobile communication device. In some cases, the rules may cause an alert to be generated, e.g., turning on a siren, a warning light, outputting a warning display on a computing terminal, or the like. In other cases, an operation may be initiated on the same or different computing device or system to respond to the identified and classified entity or action performed by the entity, e.g., enabling locks on doors, denying access to particular computing systems or computing system resources, disabling functionality of certain systems, enabling functionality of certain systems, disabling locks on doors, allowing access to particular computing systems or resources, or the like.

FIG. 7 is a block diagram of an example data processing system in which aspects of the illustrative embodiments are implemented. That is, the data processing system 700 in FIG. 7 may be specifically configured through the loading of software into memory, and processing of such software by hardware elements of the data processing system 700, modification to include specific firmware and/or specially configured hardware, or any combination of such, to implement one or more of the engines and/or logic set forth in FIG. 6 with regard to the image processing system 600, e.g., the ADAM engine 630 with SVM classifier 632 and selective dropout logic 634, entity identification engine 640 with DNN based classifier, and/or image recognition services 650. As such, the data processing system 700 in FIG. 7 is not a general purpose computing device, but is rather a specific data processing system that is specifically configured to perform the functions and operations attributed to one or more of the elements of the image processing system 600 discussed previously.

Thus, data processing system 700 is an example of a computing system, such as server 604A in FIG. 6, in which computer usable code or instructions implementing the processes for illustrative embodiments of the present invention are located. In the depicted example, data processing system 700 employs a hub architecture including north bridge and memory controller hub (NB/MCH) 702 and south bridge and input/output (I/O) controller hub (SB/ICH) 704. Processing unit 706, main memory 708, and graphics processor 710 are connected to NB/MCH 702. Graphics processor 710 is connected to NB/MCH 702 through an accelerated graphics port (AGP).

In the depicted example, local area network (LAN) adapter 712 connects to SB/ICH 704. Audio adapter 716, keyboard and mouse adapter 720, modem 722, read only memory (ROM) 724, hard disk drive (HDD) 726, CD-ROM drive 730, universal serial bus (USB) ports and other communication ports 732, and PCI/PCIe devices 734 connect to SB/ICH 704 through bus 738 and bus 740. PCI/PCIe devices may include, for example, Ethernet adapters, add-in cards, and PC cards for notebook computers. PCI uses a card bus controller, while PCIe does not. ROM 724 may be, for example, a flash basic input/output system (BIOS).

HDD 726 and CD-ROM drive 730 connect to SB/ICH 704 through bus 740. HDD 726 and CD-ROM drive 730 may use, for example, an integrated drive electronics (IDE) or serial advanced technology attachment (SATA) interface. Super I/O (SIO) device 736 is connected to SB/ICH 704.

An operating system runs on processing unit 706. The operating system coordinates and provides control of various components within the data processing system 700 in FIG. 7. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 700.

As a server, data processing system 700 may be, for example, an IBM® eServer™ System p® computer system, running the Advanced Interactive Executive (AIX®) operating system or the LINUX® operating system. Data processing system 700 may be a symmetric multiprocessor (SMP) system including a plurality of processors in processing unit 706. Alternatively, a single processor system may be employed.

Instructions for the operating system, the object-oriented programming system, and applications or programs are located on storage devices, such as HDD 726, and are loaded into main memory 708 for execution by processing unit 706. The processes for illustrative embodiments of the present invention are performed by processing unit 706 using computer usable program code, which is located in a memory such as, for example, main memory 708, ROM 724, or in one or more peripheral devices 726 and 730, for example.

A bus system, such as bus 738 or bus 740 as shown in FIG. 7, is comprised of one or more buses. Of course, the bus system may be implemented using any type of communication fabric or architecture that provides for a transfer of data between different components or devices attached to the fabric or architecture. A communication unit, such as modem 722 or network adapter 712 of FIG. 7, includes one or more devices used to transmit and receive data. A memory may be, for example, main memory 708, ROM 724, or a cache such as found in NB/MCH 702 in FIG. 7.

Those of ordinary skill in the art will appreciate that the hardware depicted in FIGS. 6 and 7 may vary depending on the implementation. Other internal hardware or peripheral devices, such as flash memory, equivalent non-volatile memory, or optical disk drives and the like, may be used in addition to or in place of the hardware depicted in FIGS. 6 and 7. Also, the processes of the illustrative embodiments may be applied to a multiprocessor data processing system, other than the SMP system mentioned previously, without departing from the spirit and scope of the present invention.

Moreover, the data processing system 700 may take the form of any of a number of different data processing systems including client computing devices, server computing devices, a tablet computer, laptop computer, telephone or other communication device, a personal digital assistant (PDA), or the like. In some illustrative examples, data processing system 700 may be a portable computing device that is configured with flash memory to provide non-volatile memory for storing operating system files and/or user-generated data, for example. Essentially, data processing system 500 may be any known or later developed data processing system without architectural limitation.

Figure 8:
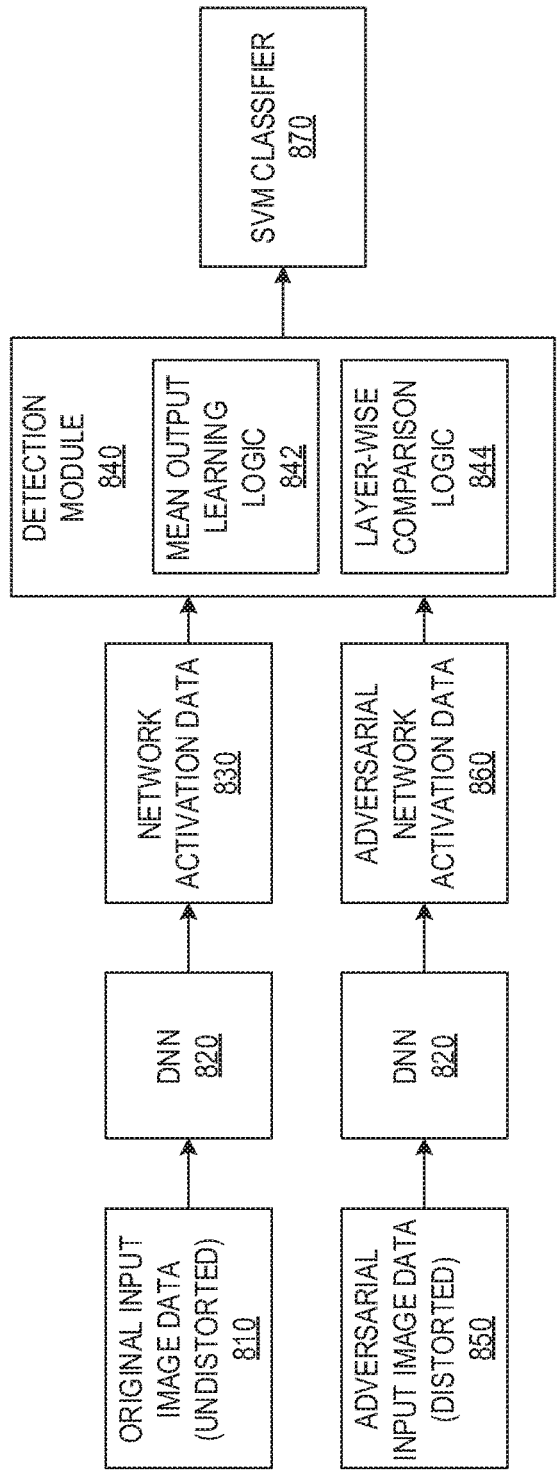
FIG. 8 is an example flow diagram illustrating a training operation for training the adversarial image detection logic in accordance with one illustrative embodiment.

FIG. 8 is an example flow diagram illustrating a training operation for training the adversarial image detection logic in accordance with one illustrative embodiment. The operation outlined in FIG. 8 is used to train the SVM classifier, such as SVM classifier 632 in FIG. 6, based on the output of intermediate, or hidden, layers of the DNN, also referred to as network activations. By way of this training, the detection module or logic is able to learn the distances of the intermediate layer activations, when given distorted image data (adversarial image data), with the mean activations for undistorted image data.

As shown in FIG. 8, original input data 810 is input to the DNN 820 to generate network activation data 830 for undistorted image data. From this activation data 830, the mean output learning logic 842 of the detection module or logic 840 learns the mean output for undistorted images for each of the intermediate layers of the DNN 820. Thus, each intermediate layer of the DNN 820 thereafter has an associated mean output vector, i.e. a vector of output values where each output value is a mean value of the actual output values generated by the intermediate layer for the various original undistorted input images 810.

Similarly, adversarial input images 850 are input to the DNN 820 which processes the adversarial input images 850 in a similar manner as the original input images 810. The adversarial input images 850 may be distorted versions of the original input images 810, or other distorted images, that are distorted according to one or more of the distortions previously mentioned above, e.g., image-level distortions, face-level distortions, or the like. The operation of the DNN 820 on the adversarial input images 850 generates adversarial network activation data 860 for the intermediate layers of the DNN 820. Thus, for each of the adversarial input images in the adversarial input 850, the adversarial network activation data 860 comprises vectors of values that will be different from those generated by the DNN 820 for the non-distorted versions of these images and/or which are different from the mean values for the intermediate layer.

The detection module or logic 840 comprises layer-wise comparison logic 844 which performs a layer-wise comparison of the network activation data 830 and 860 to thereby generate distance metrics for each of the intermediate layers of the DNN 820. These distance metrics are fed into the SVL classifier 870 as training feature vectors as previously described above. The SVL classifier 870 is thus trained to detect when certain distances of intermediate layer outputs from the mean output for the intermediate layer are indicative of an adversarial input image data.

Figure 9:
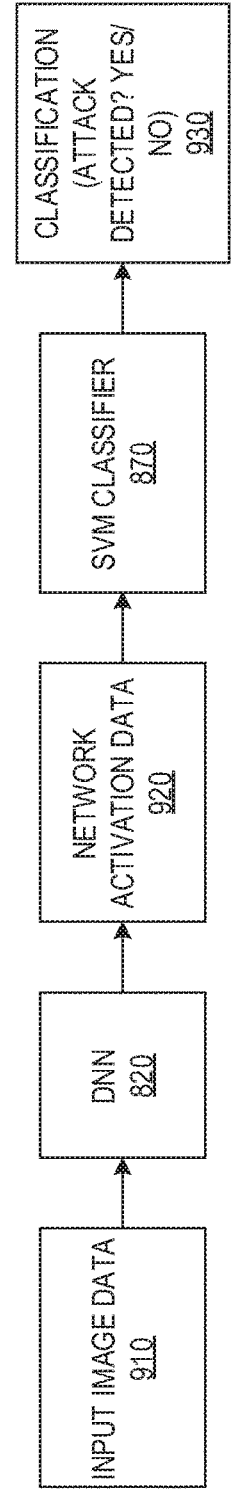
FIG. 9 is an example flow diagram illustrating an operation of a trained adversarial image detection logic in accordance with one illustrative embodiment.

FIG. 9 is an example flow diagram illustrating an operation of a trained adversarial image detection logic in accordance with one illustrative embodiment. As shown in FIG. 9, once the SVM classifier 870 is trained using the operation outlined in FIG. 8, for example, the SVL classifier 870 may be applied to network activation data for intermediate layers of the DNN 820 generated by operation of the DNN 820 on new input image data. Thus, as shown in FIG. 9, new input data 910 is input to the DNN 820, to generate new network activation data 920. The new network activation data 920 is input to the trained SVM classifier 870 which evaluates the distances of the new network activation data 920 from the means for the intermediate layers of the DNN 820, and generates an output 930 indicating whether or not the SVM classifier 870 has determined that the new input image data 910 is representative of an undistorted image or a distorted image that is part of an adversarial attack.

Thus, using the pre-trained SVM classifier 870, each input is characterized by the activations in the intermediate layers of the DNN 820. The distances of these activations are computed using the pre-computed mean for the undistorted images during training (see FIG. 8). The feature vector obtained using these distances are used to perform two-class classification with the SVM classifier 870 to determine if the input is adversarial or not. If the input is detected to be adversarial, it may be discarded or subjected to further processing, such as by way of the selective dropout logic 634 in FIG. 6, to improve the robustness of the DNN 820. That is, if the input image is not discarded due to having been identified by the SVM classifier 870 to be adversarial, then selective dropout of filters in intermediate layers of the DNN 820 may be performed based on the operation of the trained selective dropout logic 634 in FIG. 6, for example, and the input image data may be processed by the modified DNN 820 with the dropped-out filters.

Figure 10:
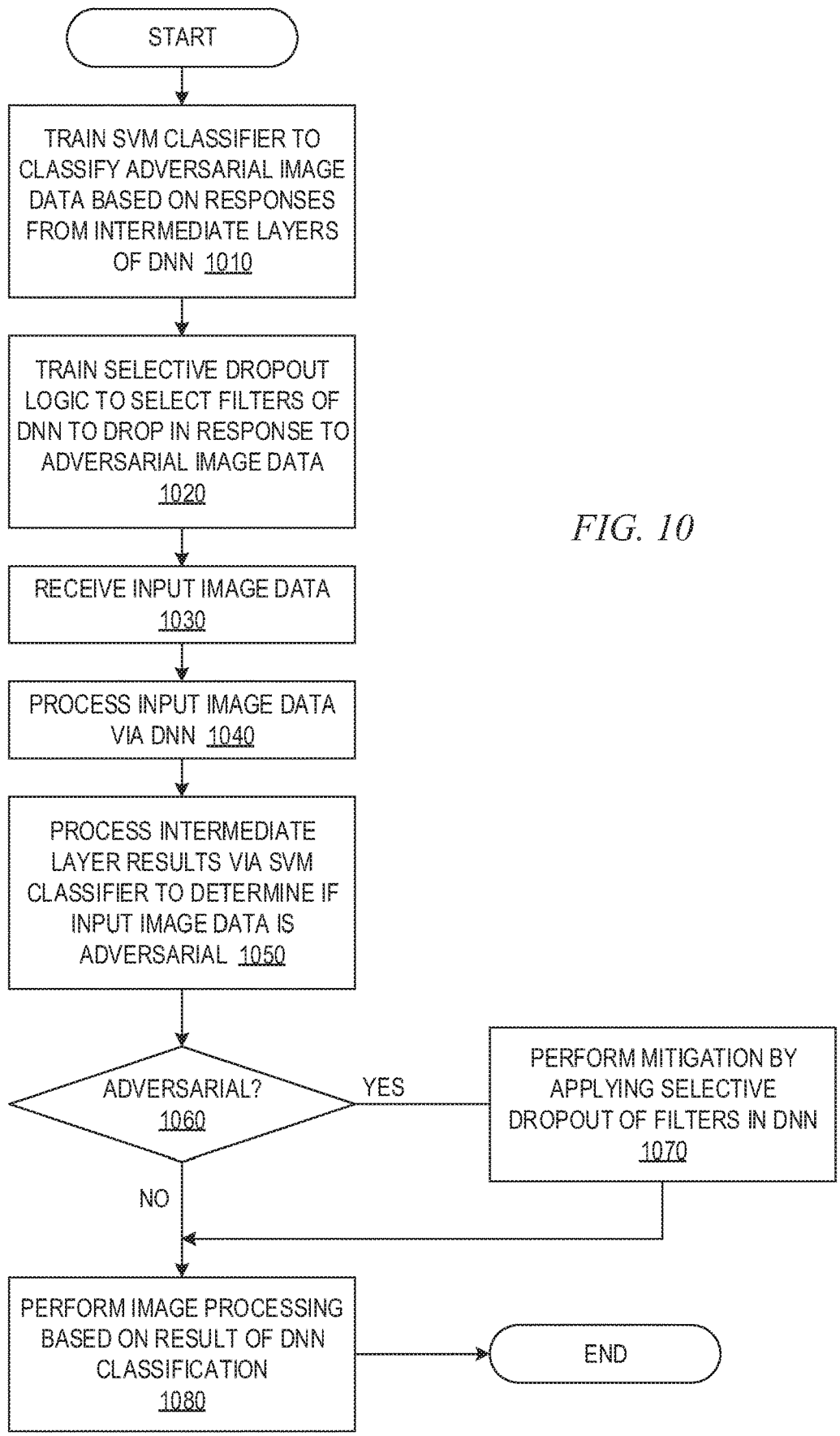
FIG. 10 is a flowchart outlining an example operation of an adversarial image detection and mitigation engine in accordance with on illustrative embodiment.

FIG. 10 is a flowchart outlining an example operation of an adversarial image detection and mitigation engine in accordance with on illustrative embodiment. As shown in FIG. 10, the operation starts by training the SVM classifier to classify adversarial image data based on responses from intermediate layers of the DNN (step 1010). As discussed above, this may involve learning the mean output of each of the intermediate layers, learning distances of the output of the intermediate layers from these mean values when presented with adversarial input data, and training the SVM classifier using feature vectors based on these learned distances.

In addition to training the SVM classifier, the selective dropout logic is trained to select filters of the DNN to drop in response to the detection of adversarial input image data (step 1020). Having trained the SVM classifier and the selective dropout logic, the image processing system receives new input image data (step 1030) and processes the input image data via the DNN (step 1040) which results in activation data specifying the responses of the intermediate layers of the DNN. The intermediate layer responses identified in the activation data is processed by the SVM classifier to determine if the input image data is adversarial or not (step 1050) and a corresponding determination is made (step 1060). If the input image data is determined to be adversarial, i.e. the input image data contains a distortion indicative of an adversarial attack, then mitigation operations are performed by applying the selective dropout logic to selectively dropout filters in the DNN that are susceptible to adversarial attack (step 1070).

Thereafter, or if the input image data is determined to not be adversarial, the image processing is performed based on the result of the processing of the input image data by the DNN (step 1080). It should be appreciated that if the input image data was determined to be adversarial, the result generated by the DNN will be based on the DNN with the selected filters having been dropped-out, i.e. their weights set to 0. The operation then terminates.

As previously mentioned above, while the illustrative embodiments are described in the context of facial recognition and facial input image data, the illustrative embodiments are not limited to such. Rather, the mechanisms of the illustrative embodiments may be applicable and implemented to identify adversarial inputs of various types in which noise or other types of distortions are added to the input data to attempt to thwart or circumvent recognition mechanisms. For example, rather than facial input image data, the mechanisms of the illustrative embodiments may be applied to audio input data, such that during training, the distance metrics are generated with regard to an original set of audio input data that is non-adversarial being used to generate the mean response information for the intermediate layers of the DNN and then adversarial audio input data is used to generate distance metrics and the feature vectors for training the SVM. Moreover, similar mechanisms as described above may be used to perform selective dropout of filters in the DNN based on audio input data. Thereafter, the trained mechanisms may be used to process new audio input data to identify whether or not the audio input data is adversarial or not, and if so invoking appropriate mitigation mechanisms, such as the selective dropout mechanisms.

The audio input data may represent any type of audio input. In some illustrative embodiments, this audio input data may represent, for example, a speech pattern of a human being. In such a case, adversarial audio input data may comprise adding or deleting a speech feature from this audio input data to thereby distort the audio input data.

Similar approaches may be applied to other types of input data as well. For example, the input data, in some illustrative embodiments, may be textual data representing a writing style of a human being. In such a case, the adversarial textual input data may comprise adding or deleting a writing style feature from the textual input data to thereby distort the textual input data. Thus, similar to the image input data and the audio input data embodiments described previously, during training, the distance metrics may be generated with regard to an original set of textual input data that is non-adversarial being used to generate the mean response information for the intermediate layers of the DNN and then adversarial textual input data is used to generate distance metrics and the feature vectors for training the SVM. Moreover, similar mechanisms as described above may be used to perform selective dropout of filters in the DNN based on textual input data. Thereafter, the trained mechanisms may be used to process new textual input data to identify whether or not the textual input data is adversarial or not, and if so invoking appropriate mitigation mechanisms, such as the selective dropout mechanisms.

Furthermore, similar approaches may be applied to input data that comprises one or more images of a scene or graphics, where these images may be part of a series of images, video content, or the like. In such a case, the adversarial input data may comprise one or more images of a scene or graphics where the one or more images have been modified by either adding or deleting a graphical feature from the one or more images. Such graphical features may take many different forms including, but not limited to, adding or removing icons, text, background elements, foreground elements, changing visual characteristics such as lighting effects, shading, or the like, of the images. Any modification to the images of a scene or graphics to add or delete a graphical feature of the image may be encompassed by the present description without departing from the spirit and scope of the present invention.

Various types of modifications may be made to original data to generate the modified or adversarial input data upon which the mechanisms of the illustrative embodiments may operate. For example, the modified or adversarial input data may be a modification of original data where the modification may be a change of label associated with the original data, a style associated with the original data, a location associated with the original data, an extent of information content of the original data, or any combination of two or more of these. With regard to a label change, the label is a portion of metadata associated with the original data and indicates some feature of the original data, such as an indicator of content present in the original data. As an example, the label of an image may be "cat" indicating that the image is of a cat, yet the adversarial modification may change the label to "dog." In speech data, the label may specify a speaker, e.g., "Donald", is speaking, yet the adversarial modification may change this designation of the speaker to be a different speaker, e.g., "George."

With regard to location changes, the metadata associated with the original data may specify a location within the image where a particular object, entity, or activity is present, e.g., top left of the image, and the adversarial modification may change this location to a different portion of the image, e.g., "bottom left." In a speech original data, the metadata may specify that the person started talking around timestamp 9:07, and the adversarial modification may change this to a different timestamp, e.g., 9:12.

For an extent modification, the original metadata of the original data may specify, for an image, the extent of what is depicted, e.g., a "big cat", and the adversarial modification may modify that extent to represent something different, e.g., "small cat". For audio or speech data, the extent may be a duration of a portion of audio, e.g., 9:05 to 9:10, and the adversarial input may specify the duration to be 9:05 to 9:15, for example.

With regard to style modifications, the original data may specify a tone or pitch of a voice present in audio data and the adversarial modification may modify the specified tone or pitch, or any other audio feature of the original data. Similarly, with image data, the metadata may specify a type of the particular objects, entities, or action shown in the image, e.g., a "Siamese cat," which may be changed to a "Persian cat" by adversarial modifications.

Any of these adversarial modifications, or other adversarial modifications that may become apparent to those of ordinary skill in the art in view of the present description, may be identified through operation of the mechanisms of the illustrative embodiments and mitigated through one or more mitigation operations as described herein.

Moreover, while the above illustrative embodiments primarily focus on the selective dropout mechanism or simply discarding the input image data in the event it is classified as adversarial by the SVM, the illustrative embodiments are not limited to such. That is other types of responsive operations may be performed to mitigate the effect of adversarial input on downstream processing of the input data. For example, in some illustrative embodiments, in response to the output of the SVM classifier indicating that the new input data is adversarial input data, a responsive operation may be performed that comprises one or more of shutting down operation of a downstream computing system, operating the downstream computing system under a conservative policy configuration, or alerting one or more contingent systems in the eco-system to take an appropriate action based on the adversarial input data. In some other illustrative embodiments, the responsive operation may comprise one or more of discontinuing further processing of the input data, generating and outputting a notification indicating detection of the adversarial input, or logging an event in a log data structure indicating detection of the adversarial input. Of course other responsive operations that will be apparent to those of ordinary skill in the art in view of the present description, and which are appropriate for the particular implementation of the illustrative embodiments, may be utilized without departing from the spirit and scope of the present invention.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, comprising:
   processing, by a neural network, original input data representing non-adversarial input data;
   determining, by mean output learning logic executing in the data processing system, a mean response for each intermediate layer of one or more intermediate layers of the neural network based on results of processing the original input data;
   processing, by the neural network, adversarial input data representing input data having one or more distortions;
   comparing, by layer-wise comparison logic executing in the data processing system, for each intermediate layer of the one or more intermediate layers of the neural network, a response generated by the intermediate layer based on processing the adversarial input data, to the mean response associated with the intermediate layer, to thereby generate one or more distance metrics for the one or more intermediate layers;
   generating, by the layer-wise comparison logic, a vector output based on the one or more distance metrics for the one or more intermediate layers; and
   training, based on the vector output, a classifier executing in the data processing system, to identify adversarial input data based on responses generated by the one or more intermediate layers of the neural network.

2. The method of claim 1, further comprising:
   receiving new input data in the neural network;
   processing the new input data through the neural network to generate intermediate layer activation data;
   processing, by the trained classifier, the intermediate layer activation data to determine whether the new input data is adversarial input data or non-adversarial input data; and
   generating, by the trained classifier, an output indicating whether the new input data is adversarial input data or non-adversarial input data based on results of the processing of the intermediate layer activation data.

3. The method of claim 2, further comprising, in response to the output of the trained classifier indicating that the new input data is adversarial input data, performing a responsive operation comprising at least one of shutting down operation of a downstream computing system, operating the downstream computing system under a conservative policy configuration, or alerting one or more contingent systems in an eco-system to take an appropriate action based on the new input data being adversarial input data.

4. The method of claim 2, further comprising, in response to the output of the trained classifier indicating that the new input data is adversarial input data, performing a responsive operation comprising at least one of discontinuing further processing of the new input data, generating and outputting a notification indicating detection of the new input data being adversarial input data, or logging an event in a log data structure indicating detection of the new input data being adversarial input data.

5. The method of claim 2, wherein the new input data is facial image data, the data processing system is a facial recognition system, and the neural network is a deep learning neural network.

6. The method of claim 1, wherein the classifier is a support vector machine (SVM) that receives the vector output and outputs a classification of input data as either adversarial or non-adversarial.

7. The method of claim 6, wherein each value in the vector output represents a distance of a response of a corresponding intermediate layer of the neural network based on processing of the adversarial image input data, compared to a mean response of the corresponding intermediate layer.

8. The method of claim 1, wherein the adversarial input data comprises one or more images of a scene or graphics, wherein the one or more images have been modified by one of adding or deleting a graphical feature from the one or more images.

9. The method of claim 1, wherein the adversarial input data is a modification of original data where the modification is at least one of a change of label associated with the original data, a style associated with the original data, a location associated with the original data, or an extent of information content of the original data.

10. The method of claim 1, wherein the adversarial input data comprises audio data representing a speech pattern of a human, wherein the audio data has been modified by one of adding or deleting a speech feature from the audio data.

11. The method of claim 1, wherein the adversarial input data comprises textual data representing a writing style of a human, wherein the textual data has been modified by one of adding or deleting a writing style feature from the textual data.

12. A computer program product comprising a computer readable storage medium having a computer readable program stored therein, wherein the computer readable program, when executed on a data processing system, causes the data processing system to:
- process, by a neural network executing on the data processing system, original input data representing non-adversarial input data;
- determine, by mean output learning logic executing in the data processing system, a mean response for each intermediate layer of one or more intermediate layers of the neural network based on results of processing the original input data;
- process, by the neural network, adversarial input data representing input data having one or more distortions;
- compare, by layer-wise comparison logic executing in the data processing system, for each intermediate layer of the one or more intermediate layers of the neural network, a response generated by the intermediate layer based on processing the adversarial input data, to the mean response associated with the intermediate layer, to thereby generate one or more distance metrics for the one or more intermediate layers;
- generate, by the layer-wise comparison logic, a vector output based on the one or more distance metrics for the one or more intermediate layers; and
- train, based on the vector output, a classifier executing in the data processing system, to identify adversarial input data based on responses generated by the one or more intermediate layers of the neural network.

13. The computer program product of claim 12, wherein the computer readable program further causes the data processing system to:
- receive new input data in the neural network;
- process the new input data through the neural network to generate intermediate layer activation data;
- process, by the trained classifier, the intermediate layer activation data to determine whether the new input data is adversarial input data or non-adversarial input data; and
- generate, by the trained classifier, an output indicating whether the new input data is adversarial input data or non-adversarial input data based on results of the processing of the intermediate layer activation data.

14. The computer program product of claim 13, wherein the computer readable program further causes the data processing system to, in response to the output of the trained classifier indicating that the new input data is adversarial input data, perform a responsive operation comprising at least one of shutting down operation of a downstream computing system, operating the downstream computing system under a conservative policy configuration, or alerting one or more contingent systems in an eco-system to take an appropriate action based on the new input data being adversarial input data.

15. The computer program product of claim 13, wherein the computer readable program further causes the data processing system to, in response to the output of the trained classifier indicating that the new input data is adversarial input data, perform a responsive operation comprising at least one of discontinuing further processing of the new input data, generating and outputting a notification indicating detection of the new input data being adversarial input data, or logging an event in a log data structure indicating detection of the new input data being adversarial input data.

16. The computer program product of claim 13, wherein the new input data is facial image data, the data processing system is a facial recognition system, and the neural network is a deep learning neural network.

17. The computer program product of claim 12, wherein the classifier is a support vector machine (SVM) that receives the vector output and outputs a classification of input data as either adversarial or non-adversarial.

18. The computer program product of claim 17, wherein each value in the vector output represents a distance of a response of a corresponding intermediate layer of the neural network based on processing of the adversarial image input data, compared to a mean response of the corresponding intermediate layer.

19. The computer program product of claim 12, wherein the adversarial input data comprises one or more images of a scene or graphics, wherein the one or more images have been modified by one of adding or deleting a graphical feature from the one or more images.

20. The computer program product of claim 12, wherein the adversarial input data is a modification of original data where the modification is at least one of a change of label associated with the original data, a style associated with the original data, a location associated with the original data, or an extent of information content of the original data.

21. The computer program product of claim 12, wherein the adversarial input data comprises at least one of:
- audio data representing a speech pattern of a human, wherein the audio data has been modified by one of adding or deleting a speech feature from the audio data; or
- textual data representing a writing style of a human, wherein the textual data has been modified by one of adding or deleting a writing style feature from the textual data.

22. A data processing system comprising:
- at least one processor; and
- at least one memory coupled to the at least one processor, wherein the at least one memory comprises instructions which, when executed by one or more of the at least one processor, cause the one or more processors to implement a neural network, mean output learning logic, layer-wise comparison logic, and a classifier that operate to:
- process, by the neural network, original input data representing non-adversarial input data;
- determine, by the mean output learning logic, a mean response for each intermediate layer of one or more intermediate layers of the neural network based on results of processing the original input data;
- process, by the neural network, adversarial input data representing input data having one or more distortions;
- compare, by the layer-wise comparison logic, for each intermediate layer of the one or more intermediate layers of the neural network, a response generated by the intermediate layer based on processing the adversarial input data, to the mean response associated with the intermediate layer, to thereby generate one or more distance metrics for the one or more intermediate layers;
- generate, by the layer-wise comparison logic, a vector output based on the one or more distance metrics for the one or more intermediate layers; and
- train, based on the vector output, the classifier executing in the data processing system, to identify adversarial input data based on responses generated by the one or more intermediate layers of the neural network.

\* \* \* \* \*